US012588605B1

(12) United States Patent
Koh

(10) Patent No.: US 12,588,605 B1
(45) Date of Patent: Mar. 31, 2026

(54) FRUIT TREE SCREEN

(71) Applicant: PUYOUNG IND. CO., LTD.,
Nonsan-si (KR)

(72) Inventor: Young Jin Koh, Seoul (KR)

(73) Assignee: PUYOUNG IND. CO., LTD.,
Nonsan-si (KR)

( * ) Notice: Subject to any disclaimer, the term of this
patent is extended or adjusted under 35
U.S.C. 154(b) by 0 days.

(21) Appl. No.: 18/971,860

(22) Filed: Dec. 6, 2024

(30) Foreign Application Priority Data

Oct. 2, 2024 (KR) ......................... 10-2024-0133806

(51) Int. Cl.
*A01G 13/22* (2025.01)
(52) U.S. Cl.
CPC .................................... *A01G 13/22* (2025.01)
(58) Field of Classification Search
CPC ................................ A01G 13/21; A01G 13/22
See application file for complete search history.

(56) References Cited

U.S. PATENT DOCUMENTS 2,251,624 A * 8/1941 Foree ..................... A01G 13/21
47/29.6
4,162,063 A 7/1979 Nissen et al.
4,677,796 A * 7/1987 Mellott ................. E04B 1/3416
52/80.1
4,766,919 A * 8/1988 Crates ....................... E04B 7/00
135/97
5,930,948 A * 8/1999 Daniel ................... A01G 13/10
135/900

6,701,948 B2 * 3/2004 Jopp ..................... E04H 15/001
135/97
6,889,470 B1 * 5/2005 Hill ......................... A01G 13/26
47/31
8,051,865 B1 * 11/2011 Uranga ................... E04H 15/54
135/33.41
(Continued)

FOREIGN PATENT DOCUMENTS

CL 67286 B1 10/2020
EP 3025580 A2 6/2016
(Continued)

OTHER PUBLICATIONS

Communication issued Oct. 27, 2025 in Australian Application No.
2024278549.

*Primary Examiner* — Michael H Wang
(74) *Attorney, Agent, or Firm* — Sughrue Mion, PLLC

(57) ABSTRACT

Provided is a fruit tree screen having a structure preventing
damage to protective sheets without using eyelets to connect
the protective sheets to each other. When protective sheets
(20) are connected to each other using a connecting member
(40), since the protective sheets (20) are connected to each
other by an elastic ring body (41), when the protective sheets
(20) move due to wind or the like, the elastic ring body (41)
absorbs impact while being elastically expanded and con-
tracted, and thus damage to the protective sheets (20) can be
effectively prevented without coupling other members, such
as eyelets, to through-holes (22). Since eyelets and the like
are not coupled to the protective sheets (20), manufacturing
costs can be lowered, the volume of packages can be
reduced, and it is possible to promptly respond to a client
demand due to simplification of the manufacturing process.

1 Claim, 8 Drawing Sheets

(56)          References Cited

U.S. PATENT DOCUMENTS

| | | | | |
|---|---|---|---|---|
| 2007/0051054 A1* | 3/2007 | Devincenzo | ............. | A01G 9/16 |
| | | | | 52/72 |
| 2014/0352208 A1* | 12/2014 | Makropoulos | ......... | A01G 13/38 |
| | | | | 47/31.1 |
| 2015/0366145 A1* | 12/2015 | Dingwerth | ............ | A45B 25/02 |
| | | | | 47/20.1 |
| 2017/0258017 A1* | 9/2017 | Scaletta | ................ | A01G 17/06 |
| 2019/0059244 A1* | 2/2019 | Toye | ...................... | A01G 13/21 |
| 2020/0323152 A1* | 10/2020 | Daios | ..................... | A01G 13/21 |
| 2022/0061233 A1* | 3/2022 | Peace | ..................... | A01G 13/22 |
| 2022/0217922 A1* | 7/2022 | Daios | ................... | E04H 15/322 |
| 2022/0307531 A1* | 9/2022 | Rodriguez | ........... | F16B 5/0692 |
| 2023/0148407 A1* | 5/2023 | Daios | .................... | A01G 13/21 |
| | | | | 47/31.1 |
| 2023/0371448 A1* | 11/2023 | Daios | .................... | A01G 13/21 |
| 2024/0044135 A1* | 2/2024 | Vollebregt | ............ | A01G 9/241 |

FOREIGN PATENT DOCUMENTS

| | | | |
|---|---|---|---|
| EP | 3461326 A1 | 4/2019 |
| EP | 4005366 A1 | 6/2022 |
| KR | 10-2327998 B1 | 11/2021 |
| WO | 2014/014365 A1 | 1/2014 |
| WO | 2017/056081 A1 | 4/2017 |

\* cited by examiner

[Fig. 1]
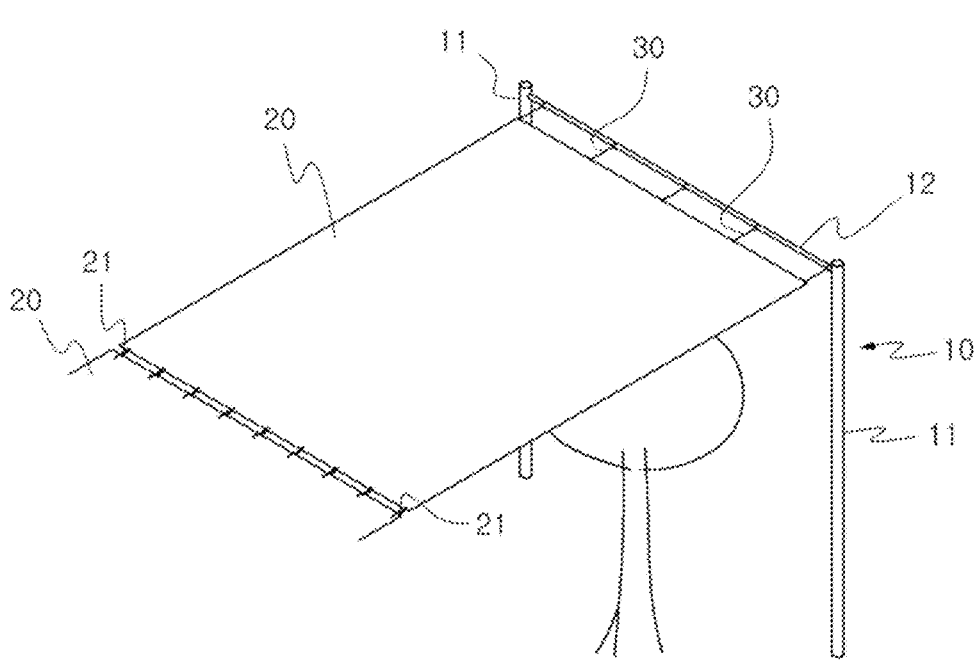

[Fig. 2]
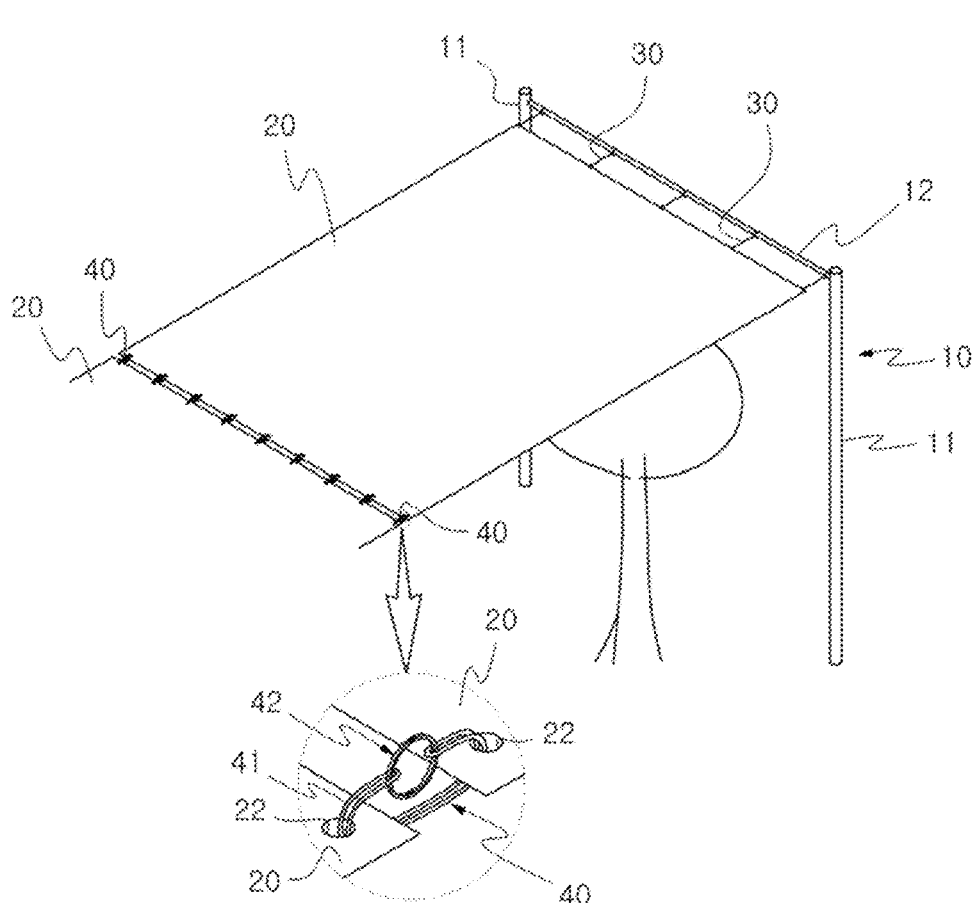

[Fig. 3]
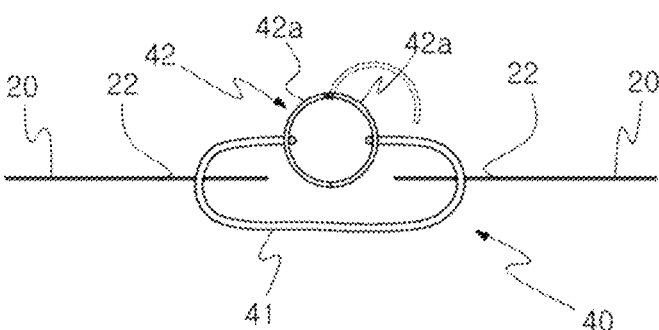

[Fig. 4]
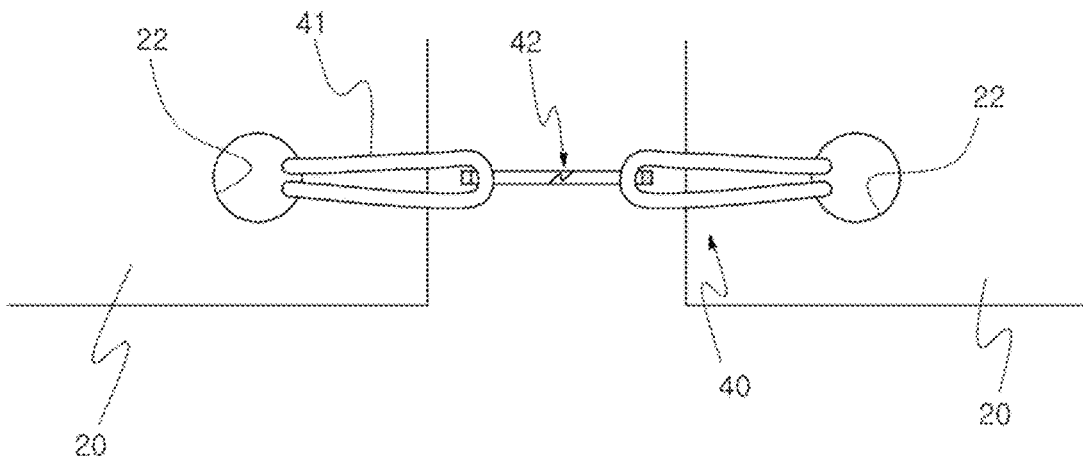

[Fig. 5]
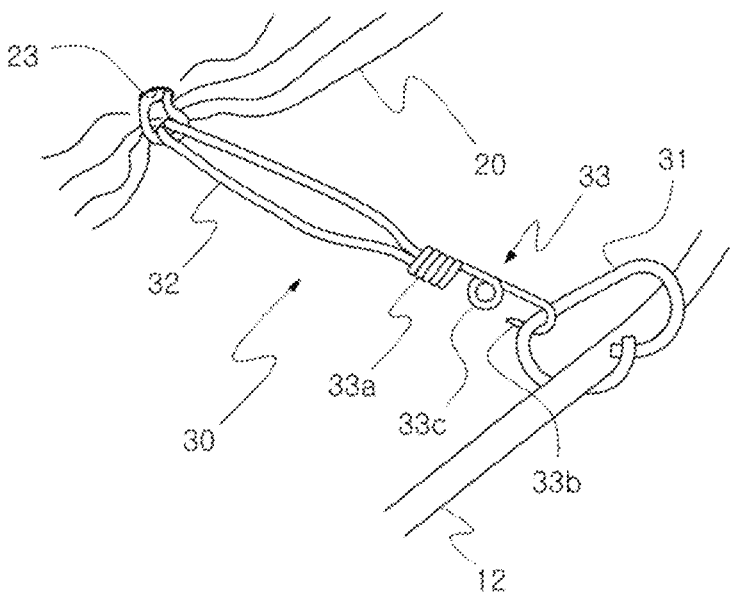

[Fig. 6]
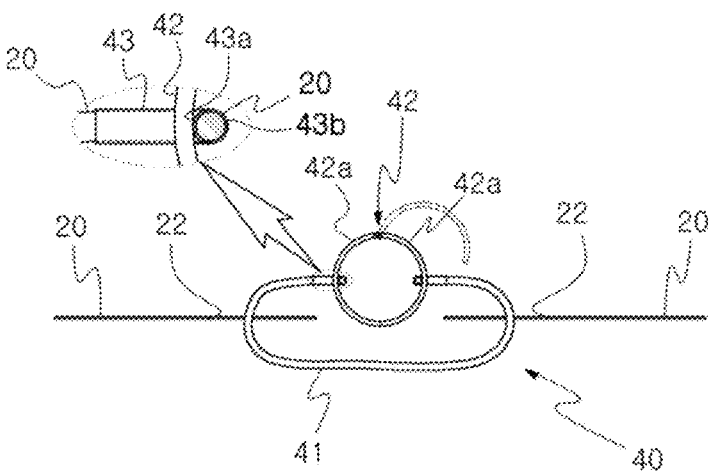

[Fig. 7]
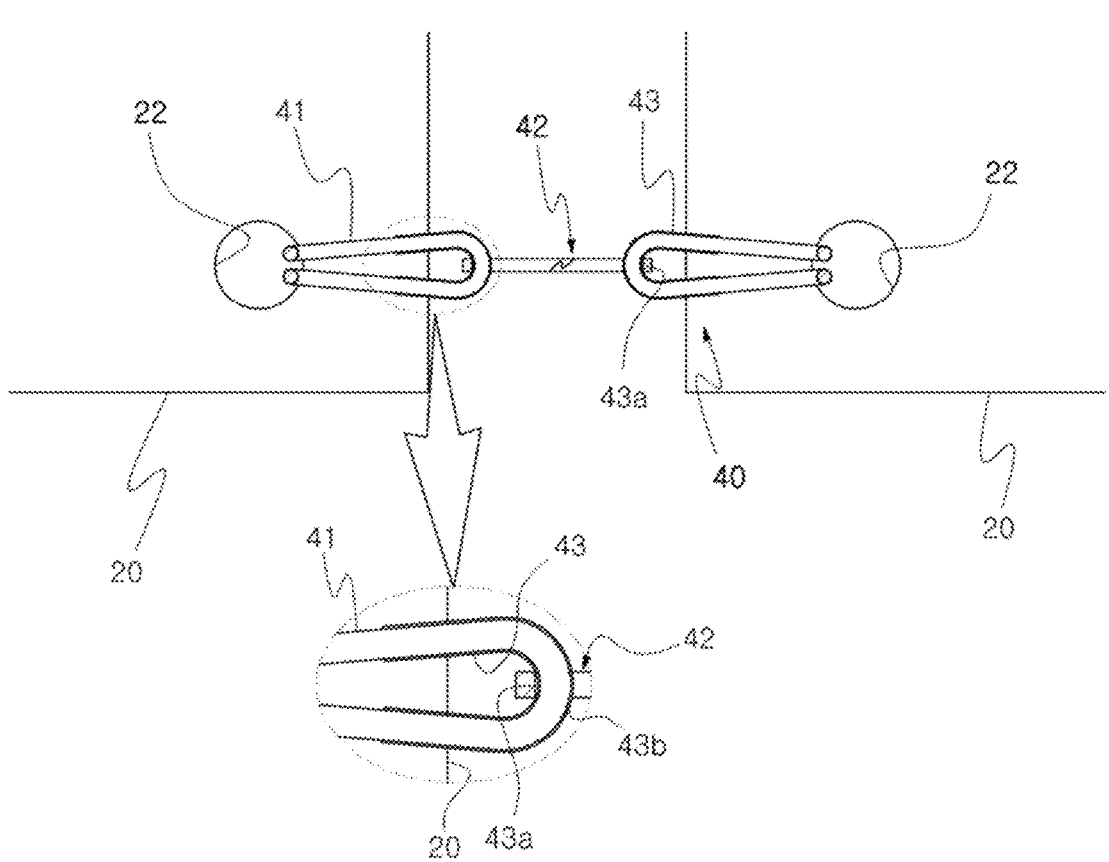

[Fig. 8]
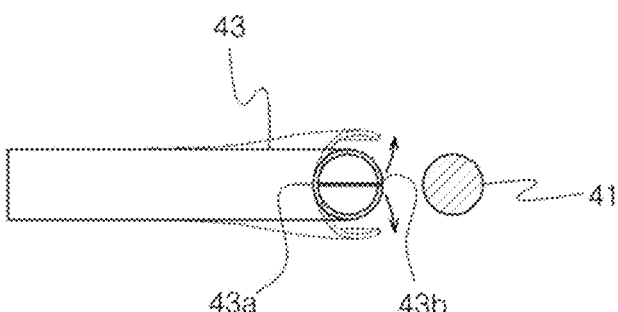

FRUIT TREE SCREEN

CROSS-REFERENCE TO RELATED APPLICATION

This application claims priority to and the benefit of Korean Patent Application No. 10-2024-0133806, filed on Oct. 2, 2024, the disclosure of which is incorporated herein by reference in its entirety.

BACKGROUND

1. Field of the Invention

The present invention relates to a fruit tree screen having a new structure that can prevent damage to protective sheets without using eyelets to connect the protective sheets to each other.

2. Discussion of Related Art

Generally, as illustrated in FIG. 1, a fruit tree screen that can protect a fruit tree from frost, hail, or excessive sunlight by covering the upper part of the fruit tree includes supports (10) provided at the front and rear of the fruit tree and a protective sheet (20) provided to extend in a front-rear direction above the fruit tree and having front and rear ends fixed to the supports (10).

The supports (10) include vertical bars (11) extending in an up-down direction and having a lower end fixed to a bottom surface to be spaced apart from each other in a lateral direction and horizontal members (12) extending in the lateral direction and having both ends fixed to the vertical bars (11).

Metal rods or high-strength wires are used as the horizontal members (12).

The protective sheet (20) is made of a wide synthetic resin material and is disposed to cover the upper part of the fruit tree. Fixing members (30) fixed to the supports (10) are provided at front and rear ends of the protective sheet (20).

Accordingly, when the fixing members (30) are coupled to the horizontal members (12) of the supports (10), the protective sheet (20) is disposed to cover the upper part of the fruit tree and protects the fruit tree from frost, hail, or excessive sunlight.

Meanwhile, since there is a limitation to the length or width of the protective sheet (20) of the fruit tree screen, a plurality of protective sheets (20) are connected to each other in the front-rear direction or lateral direction and used.

However, when connecting the protective sheets (20) as mentioned above, a method in which through-holes (22) are formed in the protective sheets (20) and the protective sheets (20) are connected to each other using clips (21) passing through the through-holes (22) has mainly been used until now.

Here, ring-shaped metal members referred to as "eyelets" are coupled to the through-holes (22).

However, in the case in which the protective sheets (20) are connected using the clips (21) as mentioned above, since the clips (21) are not able to absorb vibration, when the protective sheets (20) vibrate due to wind or the like, a problem occurs in that the protective sheets (20) are torn due to the clips (21) despite the presence of the eyelets.

In addition, in the case in which the eyelets are coupled to the through-holes (22) as mentioned above, not only does the cost increase, but also a problem occurs in that storage and transportation of the protective sheets (20) become inconvenient due to an increase in the volume of the protective sheets (20) when the protective sheets (20) are folded.

Accordingly, there is a need for a new method that can address the above problems.

RELATED ART DOCUMENT

Patent Document (Patent Document 1) Korean Patent Registration No. 10-2327998

SUMMARY OF THE INVENTION

The present invention is directed to providing a fruit tree screen having a new structure that can prevent damage to protective sheets without using eyelets to connect the protective sheets to each other.

According to an aspect of the present invention, there is provided a fruit tree screen including supports (10) provided at a front and a rear of a fruit tree and protective sheets (20) that are provided to extend in a front-rear direction above the fruit tree, have front and rear ends fixed to the supports (10), are disposed to be spaced apart from each other in the front-rear direction or a lateral direction, and are connected to each other, wherein through-holes (22) configured to pass through upper and lower surfaces of the protective sheets (20) are formed in peripheral portions of the protective sheets (20), the fruit tree screen further includes a connecting member (40) configured to pass through the through-holes (22) and connect the protective sheets (20), which are placed in the front-rear direction or the lateral direction, to each other, and the connecting member (40) includes an elastic ring body (41) that is made of an elastic synthetic resin material and has both ends coupled to pass through the through-holes (22) and a clip (42) coupled to the both ends of the elastic ring body (41) to fix the both ends of the elastic ring body (41).

According to another feature of the present invention, the supports (10) may include vertical bars (11) extending in an up-down direction and having a lower end fixed to a bottom surface to be spaced apart from each other in the lateral direction and horizontal members (12) extending in the lateral direction and having both ends fixed to the vertical bars (11), the fruit tree screen may further include fixing members (30) provided at the peripheral portions of the protective sheets (20) and coupled to the horizontal members (12), the fixing members (30) may each include a fixing clip (31) coupled to the horizontal member (12), a connecting rope (32) having one end fixed to the protective sheet (20), and a hanging hook (33) provided at the other end of the connecting rope (32) and coupled to the fixing clip (31), and the hanging hook (33) may be configured by bending a high-strength metal wire and may have a coupling part (33a), which is coupled to the connecting rope (32), formed at a rear end portion, a hook part (33b), which is coupled to the fixing clip (31), formed at a front end portion, and an impact mitigating part (33c), which is configured by being rolled to have a center line intersecting a direction in which the hanging hook (33) extends, formed at a middle portion.

According to still another feature of the present invention, a protective tubular body (43) formed in a U-shape and having a bent part (43a) formed at a central portion may be coupled to both ends of the elastic ring body (41), a cut part (43b) extending in a longitudinal direction may be formed at an outer circumferential portion of the protective tubular body (43), and the clip (42) may be coupled to the bent part (43a) of the protective tubular body (43).

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 1 is a perspective view illustrating a conventional fruit tree screen;

FIG. 2 is a perspective view illustrating a fruit tree screen according to the present invention;

FIG. 3 is a side view illustrating a connecting member of the fruit tree screen according to the present invention;

FIG. 4 is a top view illustrating the connecting member of the fruit tree screen according to the present invention;

FIG. 5 is a perspective view illustrating a fixing member of the fruit tree screen according to the present invention;

FIG. 6 is a side view illustrating a fruit tree screen according to a second embodiment of the present invention;

FIG. 7 is a top view illustrating the fruit tree screen according to the second embodiment of the present invention; and FIG. 8 is a side cross-sectional view illustrating a protective tubular body of the fruit tree screen according to the second embodiment of the present invention.

DETAILED DESCRIPTION OF EXEMPLARY EMBODIMENTS

Hereinafter, the present invention will be described in detail based on the accompanying exemplary drawings.

FIGS. 2 to 5 illustrate a fruit tree screen according to the present invention that, like a conventional fruit tree screen, includes supports 10 provided at a front and a rear of a fruit tree and protective sheets 20 provided to extend in a front-rear direction above the fruit tree and having front and rear ends fixed to the supports 10.

Here, the supports 10 include vertical bars 11 extending in an up-down direction and having a lower end fixed to a bottom surface to be spaced apart from each other in a lateral direction and horizontal members 12 extending in the lateral direction and having both ends fixed to the vertical bars 11.

In addition, according to the present invention, the protective sheets 20 are disposed to be spaced apart from each other in the front-rear direction or the lateral direction and are connected to each other by a connecting member 40.

To this end, through-holes 22 configured to pass through upper and lower surfaces of the protective sheets 20 are formed in peripheral portions of the protective sheets 20.

In addition, as illustrated in FIGS. 2 to 4, the connecting member 40 includes an elastic ring body 41 that is made of an elastic synthetic resin material and has both ends coupled to pass through the through-holes 22 and a clip 42 coupled to the both ends of the elastic ring body 41 to fix the both ends of the elastic ring body 41.

The elastic ring body 41 is configured in the shape of a slot extending in the lateral direction, and both ends of the elastic ring body 41 are disposed to pass through the through-holes 22 from a lower side to an upper side thereof.

The clip 42 is configured in a ring shape using a high-strength metal or synthetic resin material, and by both ends of the clip 42 being hung on both ends of the elastic ring body 41, the protective sheets 20 may be connected to each other by the elastic ring body 41.

In addition, fixing members 30 coupled to the horizontal members 12 are provided at the peripheral portions of the protective sheets 20.

As illustrated in FIG. 5, the fixing members 30 each include a fixing clip 31 coupled to the horizontal member 12, a connecting rope 32 having one end fixed to the protective sheet 20, and a hanging hook 33 provided at the other end of the connecting rope 32 and coupled to the fixing clip 31.

The fixing clip 31 is made of a metal or synthetic resin material.

The connecting rope 32 has the one end coupled to a coupling hole 23 formed in the peripheral portion of the protective sheet 20 and a front end portion extending in the front-rear direction of the protective sheet 20.

The hanging hook 33 is configured by bending a high-strength metal wire and has a coupling part 33a, which is coupled to the connecting rope 32, formed at a rear end portion, a hook part 33b, which is coupled to the fixing clip 31, formed at a front end portion, and an impact mitigating part 33c, which is configured by being rolled so that a middle portion of the hanging hook 33 is formed in a circular shape, formed at the middle portion.

The impact mitigating part 33c is configured by rolling the middle portion of the hanging hook 33 in a circular shape so that the impact mitigating part 33c has a center line intersecting a direction in which the hanging hook 33 extends.

Accordingly, by coupling the fixing clip 31 to the horizontal member 12 and hanging the hook part 33b of the hanging hook 33 on the fixing clip 31, the protective sheet 20 can tautly be fixed to the support 10.

In the fruit tree screen configured as mentioned above, the through-holes 22 configured to pass through the upper and lower surfaces of the protective sheets 20 are formed in the peripheral portions of the protective sheets 20, the connecting member 40 configured to pass through the through-holes 22 and connect the protective sheets 20, which are placed in the front-rear direction or the lateral direction, to each other is provided, and the connecting member 40 includes the elastic ring body 41 that is made of an elastic synthetic resin material and has both ends coupled to pass through the through-holes 22 and the clip 42 coupled to the both ends of the elastic ring body 41 to fix the both ends of the elastic ring body 41.

Accordingly, when the protective sheets 20 are connected to each other using the connecting member 40, since the protective sheets 20 are connected to each other by the elastic ring body 41, when the protective sheets 20 move due to wind or the like, the elastic ring body 41 absorbs impact while being elastically expanded and contracted, and thus there is an advantage in that damage to the protective sheets 20 can be effectively prevented without coupling other members, such as eyelets, to the through-holes 22.

In addition, since eyelets and the like are not coupled to the protective sheets 20, there are advantages in that manufacturing costs can be lowered, the volume of packages when exporting a fabric of the protective sheets 20 can be reduced, and it is possible to promptly respond to a client demand due to simplification of a manufacturing process.

In particular, since both ends of the elastic ring body 41 are fixed to each other by the clip 42, there is an advantage in that the both ends of the elastic ring body 41 can easily be fixed.

In addition, the fixing members 30 coupled to the horizontal members 12 are provided at the peripheral portions of the protective sheets 20, the fixing members 30 each include the fixing clip 31 coupled to the horizontal member 12, the connecting rope 32 having one end fixed to the protective sheet 20, and the hanging hook 33 provided at the other end of the connecting rope 32 and coupled to the fixing clip 31, the hanging hook 33 is configured by bending a high-strength metal wire and has the coupling part 33*a*, which is coupled to the connecting rope 32, formed at the rear end portion, the hook part 33*b*, which is coupled to the fixing clip 31, formed at the front end portion, and the impact mitigating part 33*c*, which is configured by being rolled to have the center line intersecting the direction in which the hanging hook 33 extends, formed at the middle portion.

Accordingly, when the protective sheets 20 vibrate due to wind or the like in a state in which the hanging hook 33 is hung on the fixing clip 31 and fixed, there is an advantage in that the impact mitigating part 33*c* can absorb impact, and damage to the protective sheets can be prevented more effectively.

FIGS. 6 to 8 illustrate a second embodiment of the present invention in which a protective tubular body 43 formed in a U-shape and having a bent part 43*a* formed at a central portion is coupled to both ends of the elastic ring body 41, and the clip 42 is coupled to the bent part 43*a* of the protective tubular body 43.

The protective tubular body 43 is made of a synthetic resin material having high wear resistance, and a cut part 43*b* extending in a longitudinal direction is formed at an outer circumferential portion of the protective tubular body 43.

Accordingly, in a state in which the outer circumferential portion of the protective tubular body 43 is spread toward upper and lower sides with respect to the cut part 43*b* as shown by a dotted line in FIG. 8, the elastic ring body 41 may be inserted into the protective tubular body 43 so that the protective tubular body 43 is coupled to an outer portion of the elastic ring body 41.

According to the fruit tree screen configured as mentioned above, the protective tubular body 43 is coupled to both ends of the elastic ring body 41, and the clip 42 is coupled to the bent part 43*a* of the protective tubular body 43.

Accordingly, there is an advantage in that when the protective sheet 20 moves and the elastic ring body 41 moves as a result, the elastic ring body 41 is prevented from being rapidly broken due to rubbing against the clip 42.

In a fruit tree screen according to the present invention, through-holes 22 configured to pass through upper and lower surfaces of protective sheets 20 are formed in peripheral portions of the protective sheets 20, a connecting member 40 configured to pass through the through-holes 22 and connect the protective sheets 20, which are placed in the front-rear direction or the lateral direction, to each other is provided, and the connecting member 40 includes an elastic ring body 41 that is made of an elastic synthetic resin material and has both ends coupled to pass through the through-holes 22 and a clip 42 coupled to the both ends of the elastic ring body 41 to fix the both ends of the elastic ring body 41.

Accordingly, when the protective sheets 20 are connected to each other using the connecting member 40, since the protective sheets 20 are connected to each other by the elastic ring body 41, when the protective sheets 20 move due to wind or the like, the elastic ring body 41 absorbs impact while being elastically expanded and contracted, and thus there is an advantage in that damage to the protective sheets 20 can be effectively prevented without coupling other members, such as eyelets, to the through-holes 22.

In addition, since eyelets and the like are not coupled to the protective sheets 20, there are advantages in that manufacturing costs can be lowered, the volume of packages when exporting a fabric of the protective sheets 20 can be reduced, and it is possible to promptly respond to a client demand due to simplification of a manufacturing process.

In particular, since both ends of the elastic ring body 41 are fixed to each other by the clip 42, there is an advantage in that the both ends of the elastic ring body 41 can easily be fixed.

What is claimed is:

1. A fruit tree screen comprising:

supports (10) provided at a front and a rear of a fruit tree; and protective sheets (20) that are provided to extend in a front-rear direction above the fruit tree, are disposed to be spaced apart from each other in the front-rear direction, are connected to each other in the front-rear direction, and a front end of one of the protective sheets (20) is fixed to two of the supports (10) at the front of the fruit tree and a rear end of another of the protective sheets (20) is fixed to two other of the supports (10) at the rear of the fruit tree, wherein the supports (10) include vertical bars (11) extending in an up-down direction and having a lower end fixed to a bottom surface to be spaced apart from each other in a lateral direction and horizontal members (12) extending in the lateral direction and having both ends fixed to the vertical bars (11), wherein through-holes (22) configured to pass through upper and lower surfaces of the protective sheets (20) are formed in peripheral portions of the protective sheets (20), wherein the fruit tree screen further comprises fixing members (30) provided at the peripheral portions of the protective sheets (20) and coupled to the horizontal members (12), and a connecting member (40) configured to pass through the through-holes (22) and connect the protective sheets (20), which are placed in the front-rear direction, to each other, wherein the connecting member (40) includes an elastic ring body (41) that is made of an elastic synthetic resin material and has both ends coupled to pass through the through-holes (22) and a clip (42) coupled to the both ends of the elastic ring body (41) to fix the both ends of the elastic ring body (41), wherein the fixing members (30) each include a fixing clip (31) coupled to the horizontal member (12), a connecting rope (32) having one end fixed to the protective sheet (20), and a hanging hook (33) provided at the other end of the connecting rope (32) and coupled to the fixing clip (31), wherein the hanging hook (33) is configured by bending a metal wire and has a coupling portion (33*a*), which is coupled to the connecting rope (32), formed at a rear end, a hook portion (33*b*), which is coupled to the fixing clip (31), formed at a front end, and an impact mitigating portion (33*c*), which is configured by being rolled to have a center line intersecting a direction in which the hanging hook (33) extends, formed at middle, wherein the coupling portion comprises a series of coils in the metal wire and a first centerline that extends through the center of each coil in the series of coils, wherein the impact mitigating portion (33*c*) comprises an impact mitigating coil separate from the coupling portion and a second centerline that extends through the center of the impact mitigating coil, wherein the hanging hook (33) comprises a plane that bisects the metal wire in the hook portion (33*b*), wherein the first centerline is parallel to the plane and the second centerline is perpendicular to the plane, wherein a protective tubular body (43) formed in a U-shape and having a bent portion (43*a*) formed at center is coupled to both ends of the elastic ring body (41), wherein a cut portion (43*b*) extending in a longitudinal direction is formed at an outer circumferential portion of the protective tubular body (43), wherein the clip (42) is coupled to the bent portion (43*a*) of the protective tubular body 43, wherein the elastic ring body (41) is configured in the shape of a slot extending in the lateral direction, and both ends of the elastic ring body (41) are disposed to pass through the through-holes (22) from a lower side to an upper side thereof, wherein both ends of the elastic ring body (41) is hung on by both ends of the clip (42), the protective sheets (20) are connected to each other by the elastic ring body (41), wherein the elastic ring body (41) is inserted into the protective tubular body (43) in a state in which the outer circumferential portion of the protective tubular body (43) is spread toward upper and lower sides with respect to the cut portion (43*b*), thereby the protective tubular body (43) being coupled to an outer portion of the elastic ring body (41), and wherein the clip (42) is coupled to the bent portion (43*a*) of the protective tubular body (43), thereby preventing the elastic ring body (41) from being broken due to rubbing against the clip (42).

* * * * *